Sept. 20, 1971    D. H. HUMES    3,605,482
IMPACT MEASURING TECHNIQUE
Filed Nov. 26, 1968
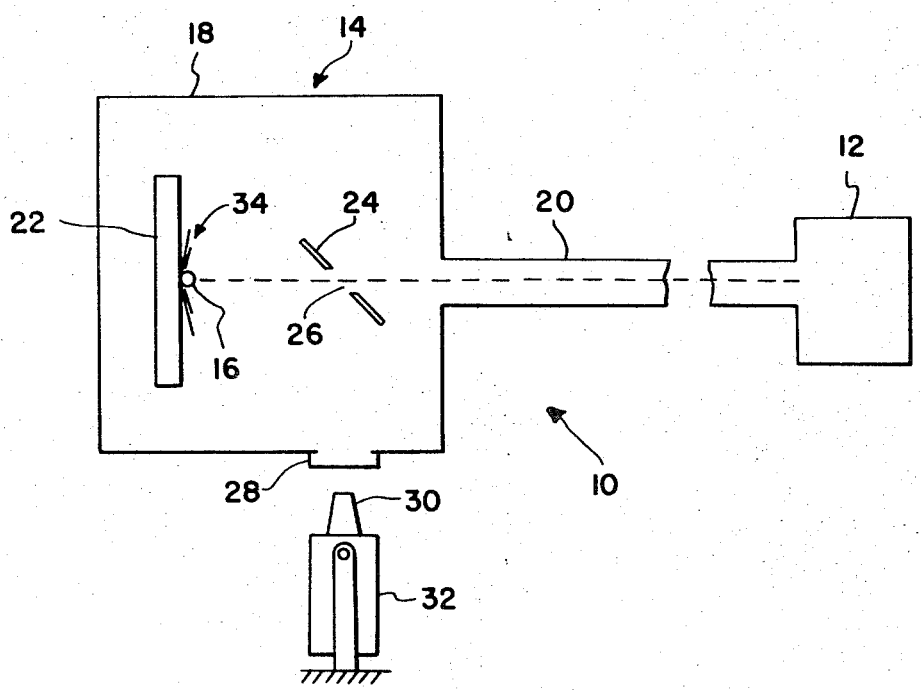
INVENTOR.
DONALD H. HUMES
BY
John R Beneful
ATTORNEYS

United States Patent Office 3,605,482
Patented Sept. 20, 1971

3,605,482
IMPACT MEASURING TECHNIQUE
Donald H. Humes, Hampton, Va., assignor to the United States of America as represented by the Administrator of the National Aeronautics and Space Administration
Filed Nov. 26, 1968, Ser. No. 779,160
Int. Cl. G01l 5/14
U.S. Cl. 73—12                                         6 Claims

ABSTRACT OF THE DISCLOSURE

This disclosure relates to a method of measuring the size of hypervelocity projectiles at the time of impact upon a target. This is accomplished by photographing the silhouetted image formed of the projectile by the impact flash along a line of view at a small angle from its line of flight.

ORIGIN OF THE INVENTION

The invention described herein was made by an employee of the United States Government and may be manufactured and used by or for the United States of America for governmental purposes without the payment of any royalties thereon or therefor.

This invention relates to size measurments of projectiles in flight, particularly to size measurements of projectiles traveling at hypervelocities.

The phenomenon of hypervelocity impact has been under investigation for many decades in connection with weapon systems and for several years in connection with meteoroid bombardment on spacecraft. Experimental and theoretical studies have been directed at obtaining the size, velocity, number, etc., of meteoroids as well as the damage they will produce in a spacecraft wall and possible means of reducing this damage.

Experimental methods of accelerating test particles to hypervelocity levels have involved the use of extremely hot gases in contact therewith which may in turn significantly erode or fragment the test particle. Hence, the mass and size of the particle at impact may be significantly different from that prior to the firing. Since such parameters are critical in any analysis of the test results, it becomes necessary to determine the size of the projectile at impact, in order to generate meaningful data.

Prior art methods usually involved photographing the projectile in flight usually along a line perpendicular to its path and then determining its size from measurments of the photographic image and the known scale factor of the optical system.

While entirely satisfactory for relatively large projectiles traveling at moderate velocities, rather severe drawbacks are encountered in applying this method to obtain size measurements of relatively small (10–100 μm.) projectiles traveling at rather high (10 mm./μsec.) velocities. The primary difficulty is one of streaking of the film image, since such projectiles move a distance on the order of their length during exposure times within the limits of state-of-the-art film and exposure mechanisms.

A further difficulty is encountered in arrangements in which focus of the optical system is critical, such as those incorporating a microscope to record the image of very small particles. This difficulty arises as a result of the uncertainty of the position of the projectile at the time of the film exposure. Present state-of-the-art exposure controls cannot insure that the projectiles will be in a position where it will be properly in focus at the time of exposure, particularly if the line-of-view of the camera system is partially along the line-of-flight of the particle, since the projectile is traveling at such a high velocity.

Since microscope optical systems have very little depth of field, the problem is aggravated in arrangements which incorporate them.

Therefore, it is an object of the present invention to provide a method for determining accurately the size at impact of projectiles traveling at hypervelocities.

It is another object to provide a system wherein the projectile is precisely located in the focal plane of the associated optics at the time of film exposure.

It is yet another object to provide a system to photograph relatively small projectiles traveling at high velocities without streaking of the film image.

These and other objects which will become apparent upon a reading of the specification are accomplished by photographing the flash caused by the impact of the projectile and target from a point of view along a line having a major component alined with the flightpath to produce a silhouetted graphic image of the projectile.

In the drawing, the figure is a schematic representation of the system according to the present invention.

Referring to the figure, the test setup is indicated generally at 10, and is comprised of a projectile accelerator 12 and an impacting test arrangement 14. Projectiles 16 are accelerated to the desired velocity by the projectile accelerator 12 and enter an access tube 20, and thence into the evacuated test chamber 18 to the target 22. As these elements and this arrangement are well known in the prior art, it is not felt necessary to describe in detail their construction and design for a proper understanding of the invention.

The apparatus for determining the size of the projectile includes a mirror 24 positioned in the path, with an aperture 26 formed therein to allow the projectile 16 to pass through to the target 22. The mirror 24 is positioned at an angle so as to direct an image of the projectile at impact to a window 28 formed in a sidewall of the chamber 18. Extraneous light as used herein is any light not caused by flash 34 to be described hereinafter. The chamber 18 also serves to exclude extraneous light. This image is received by an optical system 30 which may be a microscope lens system in the case of very small projectiles, and is photographed by an associated camera 32.

In operation, a projectile 16 is accelerated and passes through the tube 20, the aperture 26, and impacts the target 22. At velocities of the order 2 mm./μsec. and higher, this impact produces a short duration flash 34 caused by the creation of a plasma and by numerous small particles traveling outwardly and encountering stray molecules remaining in the test chamber 18. This flash occurring between the projectile 16 and the target 22 silhouettes the projectile when viewed from points away from the target, particularly from points along or just off the flight path. An image of this silhouette is reflected by the mirror 24 and directed to the window 28 and thence to the open-shutter camera 32 and associated optics 30.

The photograph thus produced can then be scaled to determine the size of the projectile at impact.

This photograph is highly accurate for several reasons. Firstly, the extremely short duration of the flash (10 μ/sec.) produces an extremely short effective exposure time, during which the projectile has moved but very slightly. Secondly, the angle of view, with the projectile moving almost directly away from the mirror 24 minimizes movement of the image across the film plane, so that the effect of even this slight movement of the projectile is minimized to the point of insignificance.

Thirdly, because the problem of focus is eliminated. As discussed earlier, the high velocity of the projectile, the angle of view, uncertainties in conventional shutter or flash control systems, all tend to make it difficult to insure that the projectile will be in a position within the focal field of the camera optical system particularly when used with a microscope lens system. Since in this arrangement the projectile produces the exposure-producing flash at the target surface, the optics can be adjusted to focus on or just above this plane, and the system is insured to be in perfect focus at the time of exposure.

It can be seen that the above advantages have been gained without the use of complex and unreliable exposure control mechanism, but by a simple and relatively foolproof arrangement.

It should be appreciated that the invention may be practiced in many other embodiments, and that the described embodiment is merely representative of the invention.

What is claimed as new and desired to be secured by Letters Patent of the United States is:

1. A projectile impacting test apparatus including:
   a test chamber;
   a target producing a flash when impacted by a projectile, said target being mounted in said test chamber;
   means for accelerating a projectile into said test chamber so as to impact said target and produce a flash; said projectile being silhouetted at the instant of impact by said flash;
   recorder means for creating a graphic image of a silhouette of said projectile at the instant of impact along a line of view having a major component along the flight-path of said projectile, said silhouette indicating the exact size of said projectile at impact.

2. The apparatus of claim 1 wherein said recorder means includes a camera and means for reflecting an image of said projectile from along said line of view to said camera.

3. The apparatus of claim 2 wherein said reflecting means includes a mirror element positioned in the flightpath of projectiles accelerated into said test chamber and having an opening formed therein to allow such projectiles to pass through said mirror.

4. The apparatus of claim 1 wherein said recorder means is a camera having a continuously open shutter; said camera having film which is subject to exposure at all times due to said open shutter, said film being exposed by the flash resulting from said projectile impacting said target.

5. The apparatus of claim 1 wherein said recorder means includes a microscope optical system focused on the target plane for magnifying the recorded image of the projectile.

6. A method of determining the size of an accelerated projectile at the instant of impact against a target comprising the steps of:
   accelerating a projectile to velocities of the order of 2 mm./$\mu$sec.;
   directing said projectile along a flightpath into a target, whereby a flash is caused at impact silhouetting said projectile;
   photographing the silhouette of said projectile at impact with said target and along a line substantially alined with said flightpath, thereby recording the exact size of said projectile at impact.

References Cited
UNITED STATES PATENTS 3,267,720  8/1966  Escallier et al. _____ 73—12

JAMES J. GILL, Primary Examiner